United States Patent [19]

Bugnon

[11] Patent Number: 5,685,901
[45] Date of Patent: *Nov. 11, 1997

[54] PIGMENT COMPOSITION OF A MODIFIED DIKETOPYRROLOPYRROLE AND AN AMINOALKYL ACRYLATE RESIN

[75] Inventor: Philippe Bugnon, Essert, Switzerland

[73] Assignee: Ciba-Geigy Corporation, Tarrytown, N.Y.

[*] Notice: The term of this patent shall not extend beyond the expiration date of Pat. No. 5,679,148.

[21] Appl. No.: 346,120

[22] Filed: Nov. 29, 1994

[30] Foreign Application Priority Data

Dec. 1, 1993 [CH] Switzerland ............... 3575/93

[51] Int. Cl.⁶ .................................................. C08K 5/06
[52] U.S. Cl. ................... 106/494; 106/22 H; 106/23 H; 106/493; 106/495; 106/497; 106/498
[58] Field of Search .................................. 106/493, 494, 106/498, 22 H, 23 H, 495, 497

[56] References Cited

U.S. PATENT DOCUMENTS

| | | | |
|---|---|---|---|
| 3,884,871 | 5/1975 | Herman et al. | 523/202 |
| 4,734,137 | 3/1988 | Kasahara et al. | 106/497 |
| 4,791,204 | 12/1988 | Jost et al. | 548/101 |
| 4,880,472 | 11/1989 | Bugnon et al. | 106/493 |
| 5,200,528 | 4/1993 | Wooden et al. | 548/453 |
| 5,274,010 | 12/1993 | Bugnon et al. | 523/206 |

FOREIGN PATENT DOCUMENTS

| | | |
|---|---|---|
| 0022746 | 1/1981 | European Pat. Off. . |
| 0201347 | 11/1986 | European Pat. Off. . |
| 0224445 | 6/1987 | European Pat. Off. . |
| 0296111 | 12/1988 | European Pat. Off. . |
| 0466646 | 1/1992 | European Pat. Off. . |
| 0511165 | 10/1992 | European Pat. Off. . |
| 4037556 | 5/1991 | Germany . |
| 58-215461 | 12/1983 | Japan . |
| 2255565 | 11/1992 | United Kingdom . |

OTHER PUBLICATIONS

Derwent Abstract 91–165344/23 of DE 4,037,556.

*Primary Examiner*—Mark L. Bell
*Assistant Examiner*—Scott L. Hertzog
*Attorney, Agent, or Firm*—Michele A. Kovaleski; Victoria M. Malia

[57] ABSTRACT

The present invention relates to a pigment composition comprising a diketopyrrolopyrrole pigment of formula (I)

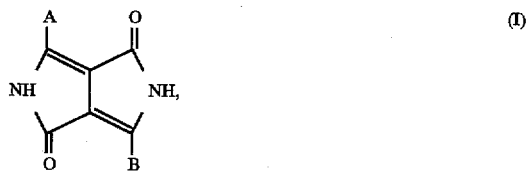

wherein A and B are as defined in claim 1, on the particle surface of which pigment an organometallic compound or a modified diketopyrrolopyrrole is adsorbed, and an aminoalkyl acrylate, and to the use of said composition for coloring organic material of high molecular weight.

12 Claims, No Drawings

PIGMENT COMPOSITION OF A MODIFIED DIKETOPYRROLOPYRROLE AND AN AMINOALKYL ACRYLATE RESIN

The present invention relates to a pigment composition comprising a diketopyrrolopyrrole pigment on the particle surface of which an organometallic compound or a modified diketopyrrolopyrrole is adsorbed, and an aminoalkyl acrylate, and to the use of said composition for colouring organic material of high molecular weight.

Various publications teach that specific properties of pigments, including also diketopyrrolopyrroles, can be enhanced by treatment with analogous, slightly modified products and/or resins. U.S. Pat. No. 4,791,204 discloses, inter alia, pigment compositions comprising a diketopyrrolopyrrole pigment and a metal or ammonium salt of a sulfonated diketopyrrolopyrrole. These compositions have excellent rheology and the colorations obtained therewith exhibit high gloss. Similar results are obtained in U.S. Pat. No. 5,200,528 with pigment compositions comprising a diketopyrrolopyrrole pigment and a diketopyrrolopyrrole containing at least one aminoalkoxy radical. U.S. Pat. No. 4,880,472 discloses organic pigments, including also diketopyrrolopyrrole pigments, the particles of which are provided with a tenacious coating of metal oxides fixed by an interlayer that contains hydroxyl groups, which pigments are likewise distinguished by very good rheology. Such pigment compositions are also very suitable for the warp-free pigmenting of polyolefins. EP-A 466 646 discloses a process for the warp-free pigmenting of polyolefins, which comprises coating the surface of the pigment particles, e.g. a diketopyrrolopyrrole, direct or indirect with a layer of a polar polymer, e.g. an acrylic polymer based on acrylic acid, methacrylic acid and/or alkyl esters thereof. In this process, the acrylic polymer layer is preferably applied to a silane layer which in turn is adsorbed on to a layer of hydrolysed zirconium acetylacetonate coating the surface of the pigment particles. U.S. Pat. No. 4,734,137 discloses a process for the preparation of azo, thioindigo and, in particular, quinacridone pigments having good rheology and superior gloss, which comprises dissolving one of said pigments in an aprotic polar solvent in the presence of an alkali metal hydroxide and water and then precipitating a pigment preparation by addition of an aqueous acidic solution of an aminoalkyl acrylate resin which, after isolation by standard methods, has the desired properties. A similar pigment preparation containing an anionic surfactant is disclosed in JP-AO 58-215 461.

It has now been found that specific diketopyrrolopyrrole pigments on the particle surface of which an organometallic compound or a modified diketopyrrolopyrrole is adsorbed, and which have been additionally treated with an aminoalkyl acrylate resin, have unexpectedly superior properties, especially as regards gloss and rheology.

Accordingly, the invention relates to a pigment composition comprising

A) a 1,4-diketopyrrolo[3,4-c]pyrrole pigment of formula

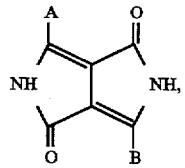   (I)

wherein A and B are each independently of the other a group of formula

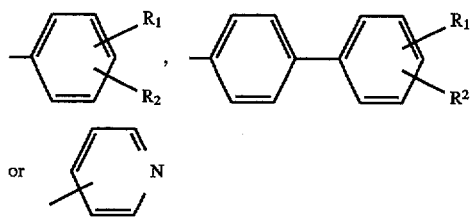

wherein $R_1$ and $R_2$ are each independently of the other hydrogen, halogen, $C_1-C_{18}$alkyl or CN, on the particle surface of which pigment there is adsorbed i) 0.1–10% by weight, based on the diketopyrrolopyrrole of formula I, of a partially hydrolysed organic compound selected from the group consisting of chelates of formula

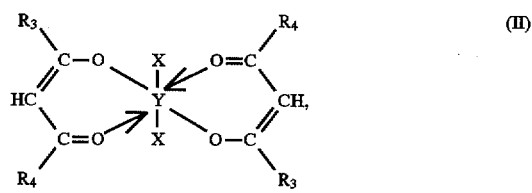   (II)

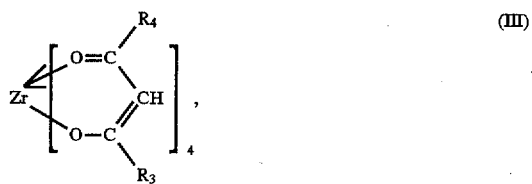   (III)

wherein $R_3$ is methyl or ethyl, $R_4$ is methyl, ethyl, methoxy or ethoxy, X is halogen or $C_1-C_4$alkoxy, and Y is Ti or Sn, or of esters of formula

$$Q(OR_5)_4 \qquad (IV),$$

wherein Q is a metal selected from the group consisting of Sn, Si, Pb, Ge, Ti or Zr, and $R_5$ is $C_1-C_4$alkyl, or ii) 0.1–10% by weight, based on the diketopyrrolopyrrole of formula I, of a diketopyrrolopyrrole of formula

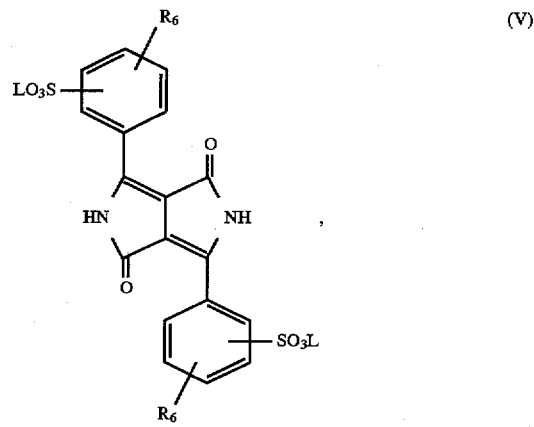   (V)

wherein $R_6$ is hydrogen, halogen, $C_1-C_4$alkyl or phenyl, and L is hydrogen, a group of formula $$\frac{M^{+n}}{n},$$

wherein M is a metal selected from the group consisting of Na, K, Mg, Ca, Sr, Ba and Al, and n is 1, 2 or 3, or L is a group $N^+H(R_7)(R_8)(R_9)$, wherein $R_7$, $R_8$ and $R_9$ are each independently of one another hydrogen, $C_1$–$C_4$alkyl, $C_5$–$C_6$cycloalkyl, unsubstituted or $C_1$–$C_4$alkyl-substituted phenyl or benzyl, or iii) 0.1–10% by weight, based on the diketopyrrolopyrrole of formula I, of a diketopyrrolopyrrole of formula

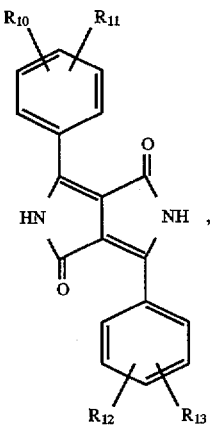

(VI)

wherein $R_{10}$, $R_{11}$, $R_{12}$ and $R_{13}$ are each independently of one another hydrogen, Cl, Br, $CH_3$, $OCH_3$, CN or phenyl, and at least one of $R_{10}$, $R_{11}$, $R_{12}$ and $R_{13}$ is a group —O(CH$_2$)$_m$—Z or —O(CH$_2$CH$_2$O)$_p$CH$_2$CH$_2$Z wherein m is and integer from 2 to 6, and p is 1 or 2, and Z is a heterocyclic radical selected from the group consisting of imidazolyl, pyrazolyl, morpholinyl, piperidinyl, pyrrolidinyl and triazolyl, or is a group —$NR_{14}R_{15}$, wherein $R_{14}$ and $R_{15}$ are each independently of the other hydrogen, methyl or ethyl, and B) 0.1–20% by weight, based on the diketopyrrolopyrrole of formula I, of an acrylic resin obtainable by homopolymerisation of a monomer of formula

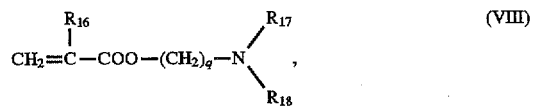

(VIII)

wherein $R_{16}$ is hydrogen or methyl and $R_{17}$ and $R_{18}$ are each independently of the other hydrogen, methyl or ethyl, and q is an integer from 1 to 6, or by copolymerisation of the same monomer with a monomer which is copolymerisable with said same monomer.

Substituents defined as $C_1$–$C_4$alkyl are methyl, ethyl, n-propyl, isopropyl, n-butyl, sec-butyl or tert-butyl. $C_1$–$C_{18}$Alkyl may additionally be n-amyl, tert-amyl, hexyl, heptyl, octyl, 2-ethylhexyl, nonyl, decyl, dodecyl, tetradecyl, hexadecyl or octadecyl.

$C_1$–$C_4$Alkoxy is typically methoxy, ethoxy, n-propoxy, isopropoxy, butoxy or tert-butoxy.

Halogen will be taken to mean iodo, fluoro, preferably bromo and, most preferably, chloro.

$C_5$–$C_6$Cycloalkyl is typically cyclopentyl and, preferably, cyclohexyl.

Components i), ii) and iii) are preferably used in an amount of 0.5–5% by weight, based on the diketopyrrolopyrrole of formula I.

In the diketopyrrolopyrrole pigment of formula I, A and B are preferably identical and are preferably a group of formula

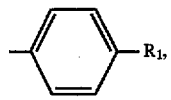

wherein $R_1$ is methyl or tert-butyl.

Particularly interesting pigment compositions are those in which component (i), preferably a partially hydrolysed compound of formula

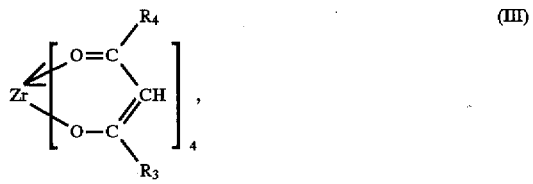

(III)

wherein $R_3$ is methyl or ethyl, and $R_4$ is methyl, ethyl, methoxy or ethoxy, is adsorbed on the particle surface of the pigment of formula I.

$R_3$ and $R_4$ in the above formula (III) are preferably methyl.

Further interesting pigment compositions are those in which component (ii) is adsorbed on the particle surface of the pigment of formula I, and in the diketopyrrolopyrrole of formula V L is a group of formula $$\frac{M^{+n}}{n},$$

wherein M is Na, K, Mg, Ca, Sr or Ba and n is 1 or 2, and $R_6$ is hydrogen, and pigment compositions in which component (iii) is adsorbed on the particle surface of the pigment of formula I, and in the diketopyrrolopyrrole of formula VI one of $R_{10}$, $R_{11}$, $R_{12}$ or $R_{13}$ is group —O(CH$_2$)$_m$NR$_{14}$R$_{15}$ or —O(CH$_2$)$_m$Z, wherein m is an integer from 2 to 4, and $R_{14}$ and $R_{15}$ are identical and are hydrogen, methyl or ethyl, and Z is morpholino, piperidinyl or pyrrolidinyl.

Particularly preferred pigment compositions of this invention are those which contain an acrylic resin B which is obtained by homopolymerisation of a monomer of formula VII, wherein $R_{16}$, $R_{17}$ and $R_{18}$ are methyl and q is 1 or 2, in an amount of 4–10% by weight, based on the diketopyrrolopyrrole of formula I.

The pigment compositions of this invention can be prepared in simple manner, typically by aftertreating the pretreated pigment Ai), Aii) or Aiii) in aqueous suspension with the acrylic resin, with stirring. A start can be made from the pretreated dry pigment powder, a filter cake or from a suspension resulting from the treatment. The acrylic resin can either be dissolved beforehand in water or added in solid form to the pigment suspension.

If necessary, the suspension Can be dispersed by conventional methods using e.g. a high-pressure homogeniser or a high-speed impeller. Usually this is not necessary, as the acrylic resins normally have very good wetting properties. The content of pigment [pretreated pigment Ai), Aii) or Aiii)] in the suspension may vary over a wide range and can be up to 40% by weight. It is expedient to use suspensions having a pigment content of 5 to 20% by weight. The aftertreatment of the pigment with the acrylic resin (B) can be carried out at room temperature, but in some cases also at up to elevated temperature of c. 80° C. The stirring time varies from 1 to 20 hours. To facilitate the filtration of the treated pigment, it is also possible to use a filter aid such as 0.5 to 15% by weight of an aliphatic 1,2-dihydroxy compound containing 8 to 22 carbon atoms, preferably 1 to 5% by weight of 1,2-dodecanediol, provided this does not adversely affect the use of the inventive pigment compositions. Analogous ingredients (e.g. customary dispersants) may also be added in usual mounts to enhance the dispersibility of the product.

The pigment preparations Ai), Aii) or Aiii) are known and can be prepared by standard methods, conveniently by adding components (i), (ii) or (iii) in powder form, in solution or in suspension to an aqueous or alcoholic suspension of the pigment of formula I and stirring the mixture under usual conditions. Component A(i) is described in U.S. Pat. No. 4,880,472, component A(ii) in U.S. Pat. No. 4,4791, 204 and component A(iii) in U.S. Pat. No. 5,200,528.

The acrylic resin (B) is likewise known and can be prepared by conventional methods, e.g. as described in U.S. Pat. No. 4,734,137.

The pigment compositions of this invention can be used as pigments for colouring organic material of high molecular weight.

Illustrative examples of organic materials of high molecular weight which can be coloured with the novel pigment compositions are cellulose ethers and esters, typically ethyl cellulose, nitrocellulose, cellulose acetate, cellulose butyrate, natural resins or synthetic resins, typically polymerisation or condensation resins, such as aminoplasts, preferably urea/formaldehyde and melamine/formaldehyde resins, alkyd resins, phenolic plastics, polycarbonates, polyolefins, polystyrene, polyvinyl chloride, polytetrafluoroethylene, polyamides, polyurethanes, polyesters, polyether ketones, polyphenylene oxides, rubber, casein, silicone and silicone resins, singly or in mixtures.

The above high molecular weight organic compounds may be singly or as mixtures in the form of plastics, melts or of spinning solutions, paints, coating materials or printing inks. Depending on the end use requirement, it is expedient to use the pigment compositions of the invention as toners or in the form of preparations. The pigment compositions of the invention can be used in an amount of 0.01 to 30% by weight, preferably 0.1 to 10% by weight, based on the high molecular weight organic material.

For pigmenting paints, coating materials and printing inks, the high molecular weight organic materials and the pigment compositions of the invention, together with optional additives such as fillers, other pigments, siccatives or plasticisers, are finely dispersed or dissolved in a common organic solvent or solvent mixture. The procedure may be such that the individual components by themselves, or also several jointly, are dispersed or dissolved in the solvent and thereafter all the components are mixed.

The colorations obtained in plastics, fibres, paint systems or printing inks have good allround fastness properties such as superior colour strength, good dispersibility, good fastness to overspraying, migration, heat, light and weathering, and they have low viscosity.

Furthermore, compared with unmodified base pigments and also with the treated pigments of the prior art, the novel pigment compositions have enhanced performance properties in application, such as enhanced rheology and shelf life, lesser separation effects, such as floating when concurrently using e.g. white pigments, a lesser tendency to flocculate, and unexpectedly high gloss. Owing to the good rheological properties of these compositions it is also possible to prepare coating materials and paints systems with high loading. They are therefore preferably suitable for colouring paints, especially for metal effect finishes.

The invention is illustrated by the following Examples.

EXAMPLE 1a

To a solution of 10 g of dimethylaminoethyl methacrylate in 30 g of water is added 0.1 g of $K_2S_2O_8$ (1% by weight of initiator, based on the monomer). The solution is repeatedly degassed, flushed with nitrogen and stirred for 5 hours at 30° C. under nitrogen. The solution is thereafter diluted with 40 ml of water. A highly viscous substance initially forms, but liquifies again.

b) 21.6 g of a 46.5% aqueous filter cake of 1,4-diketo-3, 6-bis (4-tert-butylphenyl)-pyrrolo[3,4-c]pyrrole are dispersed in 78 g of water together with 1.2 g of Zr(IV) acetyl-acetonate for 2 hours. The suspension is heated to 75° C. and the pH is adjusted to 8.5 with 0.2N aqueous NaOH. The suspension is further stirred for 3 hours, the pH falling to 6.5. Afterwards 3.8 g of the polymer solution (a) are added, and stirring is continued for another 3 hours. The suspension is then filtered, and the residue is washed with water, dried at 80° C. and pulverised.

EXAMPLE 2

Example 1 is repeated, but replacing 1,4-diketo-3,6-bis (4-tert-butylphenyl)-pyrrolo[3,4-c]pyrrole with the same amount of 1,4-diketo-3,6-bis (4-diphenyl)-pyrrolo[3,4-c] pyrrole.

EXAMPLE 3

21.6 g of a 46.5% filter cake of 1,4-diketo-3,6-bis(4-tert-butylphenyl)-pyrrolo[3,4-c]pyrrole are dispersed in 78 g of water. Then 0.12 g of the sodium salt of 1,4-diketo-3,6-diphenylpyrrolo[3,4-c]pyrrole-4',4''-disulfonic acid (prepared as described in Example 5 of U.S. Pat. No. 4,791,204) is added to the suspension, which is subsequently heated to 70° C. Then 0.13 g of $CaCl_2.2H_2O$ is slowly added. The suspension is further stirred for half an hour, filtered, and the residue is washed with water. The filter cake is taken up in 100 g of water and dispersed with 3.8 g of the polymer solution prepared according to Example 1a). The suspension is stirred for 3 hours, filtered, and the residue is washed with water, dried at 80° C. and pulverised.

EXAMPLE 4

31.4 g of a 32% aqueous filter cake of 1,4-diketo-3,6-bis (4-methylphenyl)-pyrrolo[3,4-c]pyrrole are dispersed in 69 g of water together with 1.2 g of Ti(IV)-di(acetylacetonate) -di(isopropylate) for 2 hours. The suspension is heated to 70° C. and the pH is adjusted to 8.5 with 0.2N aqueosu NaOH. The suspension is further stirred for 2 hours, the pH falling to 6.7. Then 3.8 g of the polymer solution prepared according to Example 1a are added and stirring is continued for another 2 hours. The suspension is filtered and the residue is washed with water and dried at 80° C. and pulverised.

EXAMPLE 5

Example 1 is repeated, with the sole exception that 4% instead of 1% of the initiator $K_2S_2O_8$ is used.

EXAMPLE 6

2 g of the product obtained according to Example 1b) and 48 g of a stoving lacquer comprising

| | |
|---|---|
| 56 g | of alkyd resin ALKYDAL ® F310 (Bayer AG; 60% in xylene) |
| 13 g | of melamine resin CYMEL ® 327 (Cyanamid; 90% in butanol) |
| 25 g | of xylene |
| 25 g | of butanol |
| 2.5 g | of 1-methoxy-2-propanol and |
| 1 g | of silicone oil (1% in xylene) | are mixed by conventional methods. The resultant colour lake is drawn to a film on a glass plate. Before stoving in a circulating air oven (30 minutes at 120° C.), the coating is allowed to dry in the air for c. 30 minutes at an inclination of 25°.

The gloss values are measured with a gloss meter (Zehntner ZGM 1020®) at an inclination of 20° according to DIN 67 530.

The finish so obtained has a gloss which is unexpectedly better than that of a finish obtained with an uncoated pigment.

Replacement of the product of Example 1b) with each of the products of Examples 2 to 5 gives comparable results.

EXAMPLE 7

To determine the flow properties, the products of Examples 1–5 as well as the corresponding untreated pigments are incorporated in conventional manner into an alkyd paint system (SETAL® 84, Kunstharzfabrick Synthesis BV, Holland; solids content 70% by weight).

The flow properties of the mill base so obtained, which contains 12% by weight of pigment and 42% by weight of total solids and whose pigment/binder ratio is 0.3, are determined with a HAAKE ROTOVIS CO® RV12 viscosimeter (measuring temperature: 25° C.; measuring system: SV-SP; shear range: D=0–100 [1/s]).

Compared with the mill bases obtained with untreated pigments, the mill bases obtained with the products of Examples 1–5 have markedly enhanced flow properties (viscosity values).

What is claimed is:

1. A pigment composition comprising:
A) a 1,4-diketopyrrolo[3,4-c]pyrrole pigment of formula

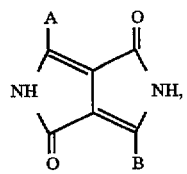

wherein A and B are each independently of the other a group of formula

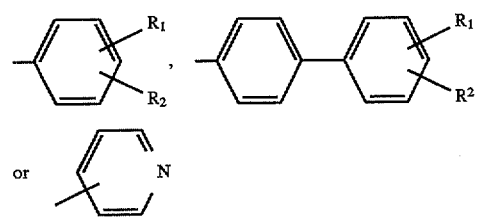

wherein $R_1$ and $R_2$ are each independently of the other hydrogen, halogen, $C_1$–$C_{18}$alkyl or CN, on the particle surface of which pigment there is adsorbed i) 0.1–10% by weight, based on the diketopyrrolopyrrole of formula I, of a partially hydrolysed organic compound selected from the group consisting of chelates of formula

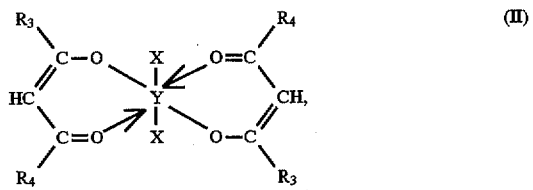

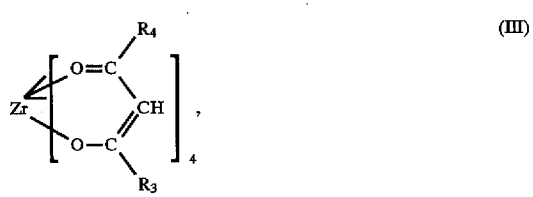

wherein $R_3$ is methyl or ethyl, $R_4$ is methyl, ethyl, methoxy or ethoxy, X is halogen or $C_1$–$C_4$alkoxy, and Y is Ti or Sn, or of esters of formula $$Q(OR_5)_4 \qquad (IV),$$

wherein Q is a metal selected from the group consisting of Sn, Si, Pb, Ge, Ti or Zr, and $R_5$ is $C_1$–$C_4$alkyl, or ii) 0.1–10% by weight, based on the diketopyrrolopyrrole of formula I, of a diketopyrrolopyrrole of formula

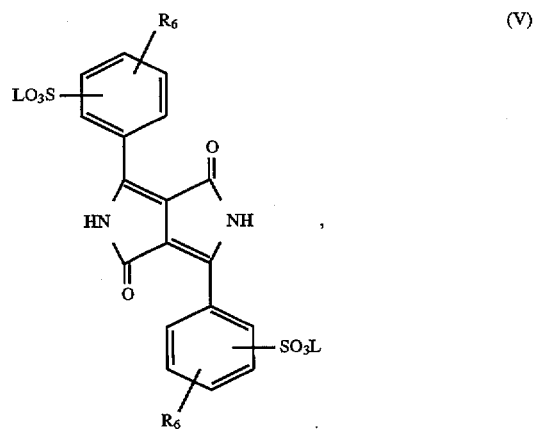

wherein $R_6$ is hydrogen, halogen, $C_1$–$C_4$alkyl or phenyl, and L is hydrogen, a group of formula

wherein M is a metal selected from the group consisting of Na, K, Mg, Ca, Sr, Ba and Al, and n is 1, 2 or 3, or L is a group $N^+H(R_7)(R_8)(R_9)$, wherein $R_7$, $R_8$ and $R_9$ are each independently of one another hydrogen, $C_1$–$C_4$alkyl, $C_5$–$C_6$cycloalkyl, unsubstituted or $C_1$–$C_4$alkyl-substituted phenyl or benzyl, or iii) 0.1–10% by weight, based on the diketopyrrolopyrrole of formula I, of a diketopyrrolopyrrole of formula

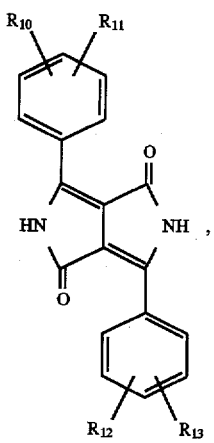

wherein $R_{10}$, $R_{11}$, $R_{12}$ and $R_{13}$ are each independently of one mother hydrogen, Cl, Br, $CH_3$, $OCH_3$, CN or phenyl, and at least one of $R_{10}$, $R_{11}$, $R_{12}$ and $R_{13}$ is a group $$-O(CH_2)_m-Z \text{ or } -O(CH_2CH_2O)_pCH_2CH_2Z$$

wherein m is and integer from 2 to 6, and p is 1 or 2, and

Z is a heterocyclic radical selected from the group consisting of imidazolyl, pyrazolyl, morpholinyl, piperidinyl, pyrrolidinyl and triazolyl, or is a group —$NR_{14}R_{15}$, wherein $R_{14}$ and $R_{15}$ are each independently of the other hydrogen, methyl or ethyl, and B) 0.1–20% by weight, based on the diketopyrrolopyrrole of formula I, of an acrylic resin obtained by solution homopolymerisation of a monomer of formula

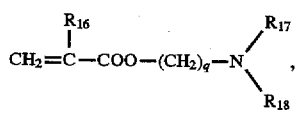  (VIII)

wherein $R_{16}$ is hydrogen or methyl and $R_{17}$ and $R_{18}$ are each independently of the other hydrogen, methyl or ethyl, and q is an integer from 1 to 6, or by solution copolymerisation of the same monomer with a monomer which is copolymerisable with said same monomer.

2. A pigment composition according to claim 1, wherein component i), ii) or iii) is used in an amount of 0.5 to 5% by weight, based on the dikeopyrrolopyrrole of formula I.

3. A pigment composition according to claim 1, wherein A and B are identical in the 1,4-diketopyrrolo[3,4-c]pyrrole pigment of formula I.

4. A pigment composition according to claim 3, wherein A and B are a group of formula

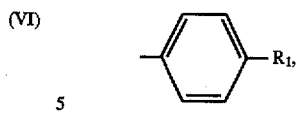  (VI)

wherein $R_1$ is methyl or tert-butyl.

5. A pigment composition according to claim 1, wherein component i) is adsorbed on the particle surface of the pigment of formula I.

6. A pigment composition according to claim 5, wherein a partially hydrolysed compound of formula

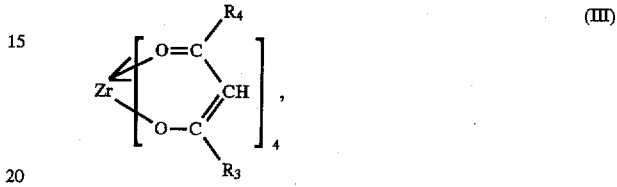  (III)

wherein $R_3$ is methyl or ethyl, and $R_4$ is methyl, ethyl, methoxy or ethoxy, is adsorbed on the particle surface of the pigment of formula I.

7. A pigment composition according to claim 6, wherein $R_3$ and $R_4$ are methyl.

8. A pigment composition according to claim 1, wherein component (ii) is adsorbed on the particle surface of the pigment of formula I, and in the diketopyrrolopyrrole of formula V L is a group of formula $$\frac{M^{+n}}{n},$$

wherein M is Na, K, Mg, Ca, Sr or Ba and n is 1 or 2, and $R_6$ is hydrogen.

9. A pigment composition according to claim 1, wherein component (iii) is adsorbed on the particle surface of the pigment of formula I, and in the diketopyrrolopyrrole of formula VI one of $R_{10}$, $R_{11}$, $R_{12}$ or $R_{13}$ is group $$-O(CH_2)_mNR_{14}R_{15} \text{ or } -O(CH_2)_mZ,$$

wherein m is an integer from 2 to 4, and $R_{14}$ and $R_{15}$ are identical and are hydrogen, methyl or ethyl, and Z is morpholino, piperidinyl or pyrrolidinyl.

10. A pigment composition according to claim 1, which contains an acrylic resin B, which is obtained by solution homopolymerisation of a monomer of formula VII, wherein $R_{16}$, $R_{17}$ and $R_{18}$ are methyl and q is 1 or 2, in an amount of 4–10% by weight, based on the diketopyrrolopyrrole of formula I.

11. Organic material of high molecular weight coloured with a pigment composition as claimed in claim 1.

12. Organic material of high molecular weight according to claim 11, which is a paint system or a printing ink.

* * * * *